(12) United States Patent
Hotei et al.

(10) Patent No.: US 8,342,724 B2
(45) Date of Patent: Jan. 1, 2013

(54) REAR LIGHTING DEVICE FOR A VEHICLE

(75) Inventors: Takashi Hotei, Saitama (JP); Satoshi Kogo, Saitama (JP); Hayato Ohashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 359 days.

(21) Appl. No.: 12/881,405

(22) Filed: Sep. 14, 2010

(65) Prior Publication Data
US 2011/0063862 A1  Mar. 17, 2011

(30) Foreign Application Priority Data

Sep. 16, 2009 (JP) ................. 2009-214997

(51) Int. Cl.
*B62J 6/04* (2006.01)
(52) U.S. Cl. ....................... 362/473; 362/541
(58) Field of Classification Search .............. 362/473, 362/540, 541
See application file for complete search history.

(56) References Cited

U.S. PATENT DOCUMENTS

| | | |
|---|---|---|
| 2006/0181892 A1 | 8/2006 | Worakasemsuk et al. |
| 2007/0025113 A1 | 2/2007 | Isayama et al. |
| 2009/0196056 A1 * | 8/2009 | Kageyama ............ 362/473 |

FOREIGN PATENT DOCUMENTS

| | | |
|---|---|---|
| EP | 1 245 442 A2 | 10/2002 |
| EP | 1 285 847 A1 | 2/2003 |
| EP | 1 645 797 A2 | 4/2006 |
| EP | 1 785 341 A1 | 5/2007 |
| JP | 3580516 B2 | 10/2004 |
| JP | 2006 131084 A | 5/2006 |
| JP | 2008 62833 A | 3/2008 |

OTHER PUBLICATIONS

European Search Report application No. 10171603.3 dated Nov. 16, 2010.

* cited by examiner

*Primary Examiner* — David V Bruce
(74) *Attorney, Agent, or Firm* — Squire Sanders (US) LLP

(57) ABSTRACT

A rear combination lamp includes a reflector 102, a tail lamp bulb 82 and a tail/stop lamp bulb 83 attached to the reflector 102, and a lens 91 disposed rearward of the bulbs 82, 83 and attached to a tail lamp reflector portion 103. When the rear combination lamp is attached to a motorcycle, the lens 91 is provided to be inclined obliquely rearwardly and upwardly. An upper half portion of the lens 91 is formed to have a cut-lens portion 92, as a uniform-light-emission design surface, processed with projections and depressions in a vehicle width direction. A lower half portion of the lens 91 is formed to have a clear lens portion 93, as a clear lens surface, disposed frontward, in a vehicle body, of an extension line 132 of the cut-lens portion 92.

15 Claims, 10 Drawing Sheets

(a)

(b)

(c)

REAR LIGHTING DEVICE FOR A VEHICLE

BACKGROUND

1. Field

Embodiments of the present invention relate to an improvement of a structure of a rear lighting device for a vehicle, such as a motorcycle.

2. Description of the Related Art

A conventional structure of a rear lighting device for a motorcycle has been known to include a turn signal lamp lens including a clear lens portion that allows a bulb to be seen therethrough from the outside, and a cut portion that makes it difficult to see the bulb by use of diffuse reflection (see, for example, Japanese Patent No. 3580516).

According to Japanese Patent No. 3580516, a turn signal lamp is provided with a clear lens portion and a cut portion. The clear lens portion is transparent and located in a center portion of a lens in such a manner as to face a bulb. The cut portion is located in a peripheral portion of the lens in such a manner as to surround the clear lens portion, and has projections and depressions which cause diffuse reflection.

For example, consider a case where a combination lamp is formed by integrating the turn signal lamp with a tail lamp, and where the light emission area of the turn signal lamp is made large for improving the visibility of the turn signal lamp when viewed from rear of the vehicle. In such a case, it is conceivable that the clear lens portion and the cut portion greatly differ from each other in light emission intensity.

As shown in Japanese Patent No. 3580516, the clear lens portion is located to extend in a vertical direction with respect to the ground. Accordingly, when a person views the turn signal lamp obliquely from behind and above the motorcycle, the person can see both the clear lens portion and the cut portion. Hence, light from the bulb directly reaches the eyes through the clear lens portion, and the difference in light emission intensity between the clear lens portion and the cut portion is recognized, as mentioned above. For this reason, it is conceivable that the difference in light emission intensity may be more visible in some cases.

Moreover, in some cases, in order to improve the marketability of the rear lighting device as described above, the rear lighting device is desirably designed to look slim and simple when viewed by a person from behind the motorcycle, thereby providing the rear portion of the vehicle with a light impression.

SUMMARY

An object of the present invention is to solve the above-described problems and consequently to provide a structure of a rear lighting device for a motorcycle capable of improving the appearance and the marketability of a rear lighting device while securing the visibility.

One embodiment of the present invention provides a rear lighting device for a vehicle. The device may include a reflector, a bulb attached to the reflector, and a lens disposed rearward of the bulb and attached to the reflector. The lens is configured to be inclined obliquely rearwardly and upwardly. An upper half portion of the lens is formed to have a uniform-light-emission design surface being processed with projections and depressions and extending in a vehicle width direction. A lower half portion of the lens is formed to have a clear lens surface disposed frontward, in a vehicle body, of an extension line of the uniform-light-emission design surface.

According to another embodiment of the present invention, the bulb is visible through the clear lens surface when viewed horizontally from rear of the motorcycle.

According to another embodiment of the present invention, the rear lighting device includes a pair of left and right turn signal lamps provided integrally with a tail lamp in a rear portion of the vehicle body. The uniform-light-emission design surface is formed with a height that is gradually increased from side portions of the vehicle body to a center portion of the vehicle body, and a reference axis of the bulb is inclined in such a manner as to become closer to the center portion of the vehicle body toward a rear of the vehicle body.

According to an embodiment of the present invention, the clear lens surface is inclined more gently than the uniform-light-emission design surface.

According to one embodiment of the present invention, the rear lighting device includes the tail lamp between the left and right turn signal lamps. The uniform-light-emission design surface is formed in the upper half portion of the lens in such a manner that the uniform-light-emission design surface provided to the tail lamp extends to the center portion of the vehicle body from sides of the uniform-light-emission design surface provided to the left and right turn signal lamps. When viewed horizontally from behind, the uniform-light-emission design surface for the tail lamp has a belt-like shape curved to be convex upward, and is provided above a tail/stop lamp bulb provided to the tail lamp. The tail/stop lamp bulb may also serve as a stop lamp bulb, and the clear lens surface provided to the tail lamp is disposed rearward of the tail/stop lamp bulb.

According to another embodiment, a tail lamp bulb is provided on a center side of the vehicle body, frontward of the uniform-light-emission design surface for the tail lamp, and above the tail/stop lamp bulb. The tail/stop lamp bulb is disposed on a horizontal line passing through left and right turn signal lamp bulbs and extending in the vehicle width direction.

According to one embodiment, the clear lens surface of the tail lamp is located frontward of an extension line of the uniform-light-emission design surface of the tail lamp.

Another embodiment includes a method of providing a rear lighting device for a vehicle. The method includes providing a reflector, attaching a bulb to the reflector, and attaching a lens, disposed rearward of the bulb, to the reflector. Configuring the lens to be inclined obliquely rearwardly and upwardly, forming an upper half portion of the lens to include a uniform-light-emission design surface including projections and depressions and extending in a vehicle width direction, and forming a lower half portion of the lens to include a clear lens surface disposed frontward, in a vehicle body, of an extension line of the uniform-light-emission design surface.

DETAILED DESCRIPTION

Figure 1:
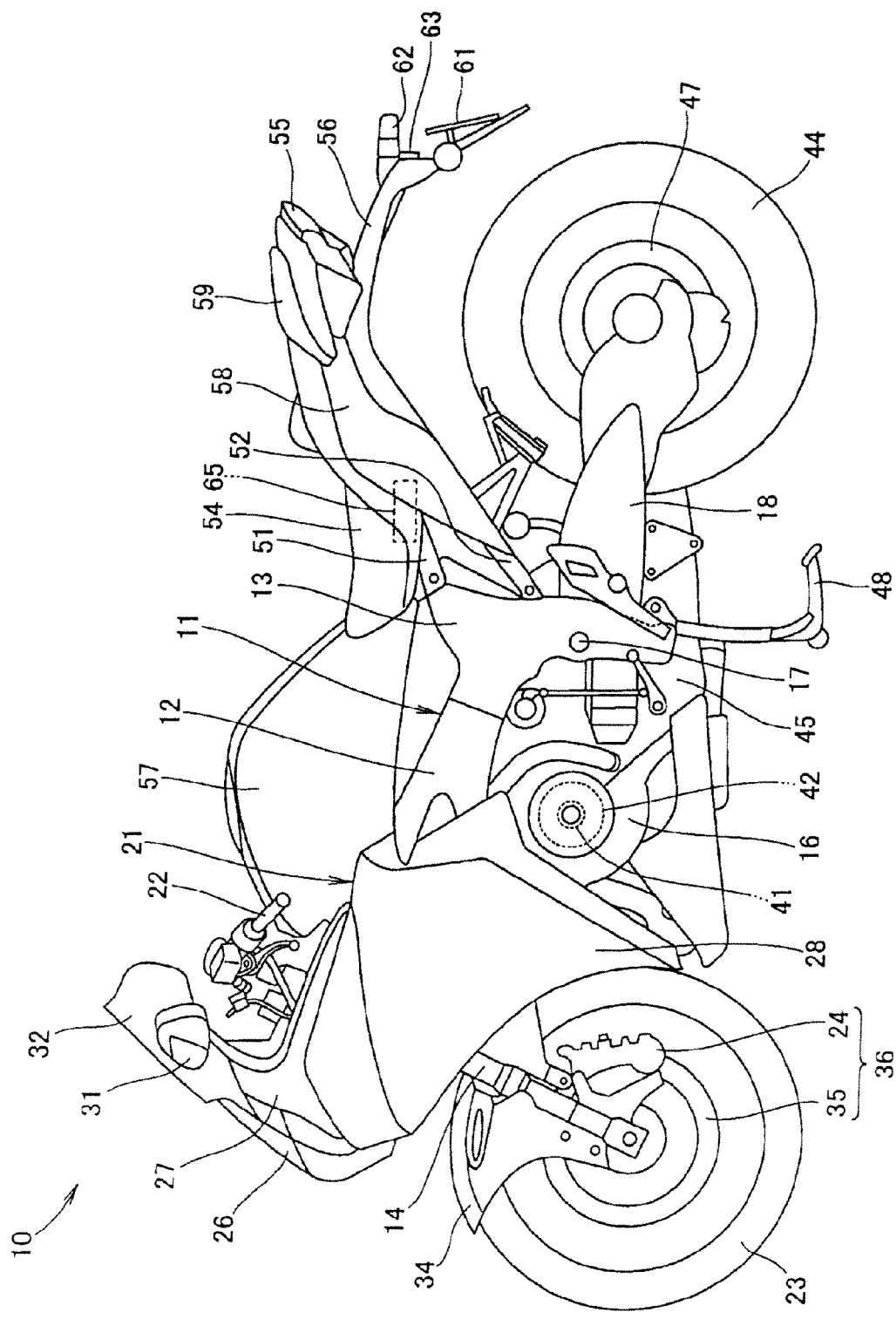
FIG. 1 is a side view of a vehicle, such as a motorcycle, including a structure of a rear lighting device according to one embodiment of the present invention.

Hereinafter, examples for carrying out the present invention will be described on the basis of the attached drawings. Note that, left, right, front and rear in the description show directions as seen by a driver on a vehicle. In addition, each drawing is to be viewed in a direction of reference numerals.

An embodiment of the present invention will be described below. The arrows (FRONT) in the drawings point toward the front of a vehicle. As shown in FIG. 1, in a vehicle such as a motorcycle 10, a vehicle body frame 11 constituting a frame can include: a pair of left and right main frames 12, 12 (only the reference numeral 12 on the near side is shown); and a pair of left and right pivot plates 13, 13 (only the reference numeral 13 on the near side is shown) connected to rear end portions of these main frames 12, 12. In the motorcycle 10, a front fork 14 is steerably supported by the main frames 12, 12 at front end portions thereof. An engine 16 with a built-in transmission is supported by the main frames 12, 12 and the pivot plates 13, 13, and a swing arm 18 is supported swingably in a vertical direction by the pivot plates 13, 13 through a pivot shaft 17.

An upper front portion and both side portions of the front fork 14 may be covered with a cowling 21. A handlebar 22 is attached to an upper end portion of the front fork 14. A front wheel 23 and a brake caliper 24 are attached to a lower end portion of the front fork 14.

The cowling 21 may include a front cowl 27 to which a head lamp 26 is attached, and a pair of left and right side cowls 28, 28 (only the reference numeral 28 on the near side is shown) extending rearwardly and downwardly from sides of the front cowl 27. Note that the reference numerals 31, 31 denote a pair of left and right front turn signal lamps attached to the front cowl 27, and the reference numeral 32 denotes a windscreen extending obliquely upwardly and rearwardly from an upper portion of the front cowl 27.

The front wheel 23 is covered with a front fender 34 whose upper portion is attached to the front fork 14.

The brake caliper 24, together with a break disk 35 integrally attached to the front wheel 23, constitutes a front disk break 36.

A crankcase of the engine 16 includes a crankshaft 41 extending in a vehicle width direction, and an AC generator 42 having a rotor attached to one end of the crankshaft 41 and a stator attached to the other end of the crankshaft 41.

A front end portion of the swing arm 18 is attached to the pivot shaft 17. A rear wheel 44 is attached to a rear end portion of the swing arm 18. The swing arm 18 houses a drive shaft (not shown) for transmitting a driving force from a transmission 45 provided in a rear portion of the engine 16 to the rear wheel 44. Other torque transmission systems, such as a chain or a belt, may also be used. Note that the reference numeral 47 denotes a brake disk constituting a rear disk brake, and the reference numeral 48 denotes a main stand attached to a lower end portion of the pivot plates 13, 13.

To rear upper portions of the pivot plates 13, 13, a pair of left and right seat rails 51, 51 (only the reference numeral 51 on the near side is shown) and a pair of left and right sub frames 52, 52 (only the reference numeral 52 on the near side is shown) are attached. Rear end portions of these seat rails 51, 51 and these sub frames 52, 52 are connected to each other.

A seat 54, and a rear combination lamp 55 disposed rearward of the seat 54, are attached to the seat rails 51, 51. A rear fender 56 covering an upper portion of the rear wheel 44 is attached to the seat rails 51, 51 and the sub frames 52, 52.

Here, the reference numeral 57 denotes a fuel tank attached to an upper portion of the vehicle body frame 11. The reference numerals 58, 58 (only the reference numeral 58 on the near side is shown) denote a pair of left and right side covers covering lateral lower portions of the seat 54. The reference numerals 59, 59 (only the reference numeral 59 on the near side is shown) denote a pair of left and right grab rails, which can be grabbed by a fellow passenger seated on a rear portion of the seat 54. The reference numeral 61 denotes a license plate. The reference numeral 62 denotes a license plate lamp. The reference numeral 63 denotes a reflex reflector.

Between the left and right seat rails 51, 51 and below the seat 54, a regulator 65 for controlling the output of the AC generator 42 can be disposed. This regulator 65 may be connected to a battery, which is not shown.

Figure 2:
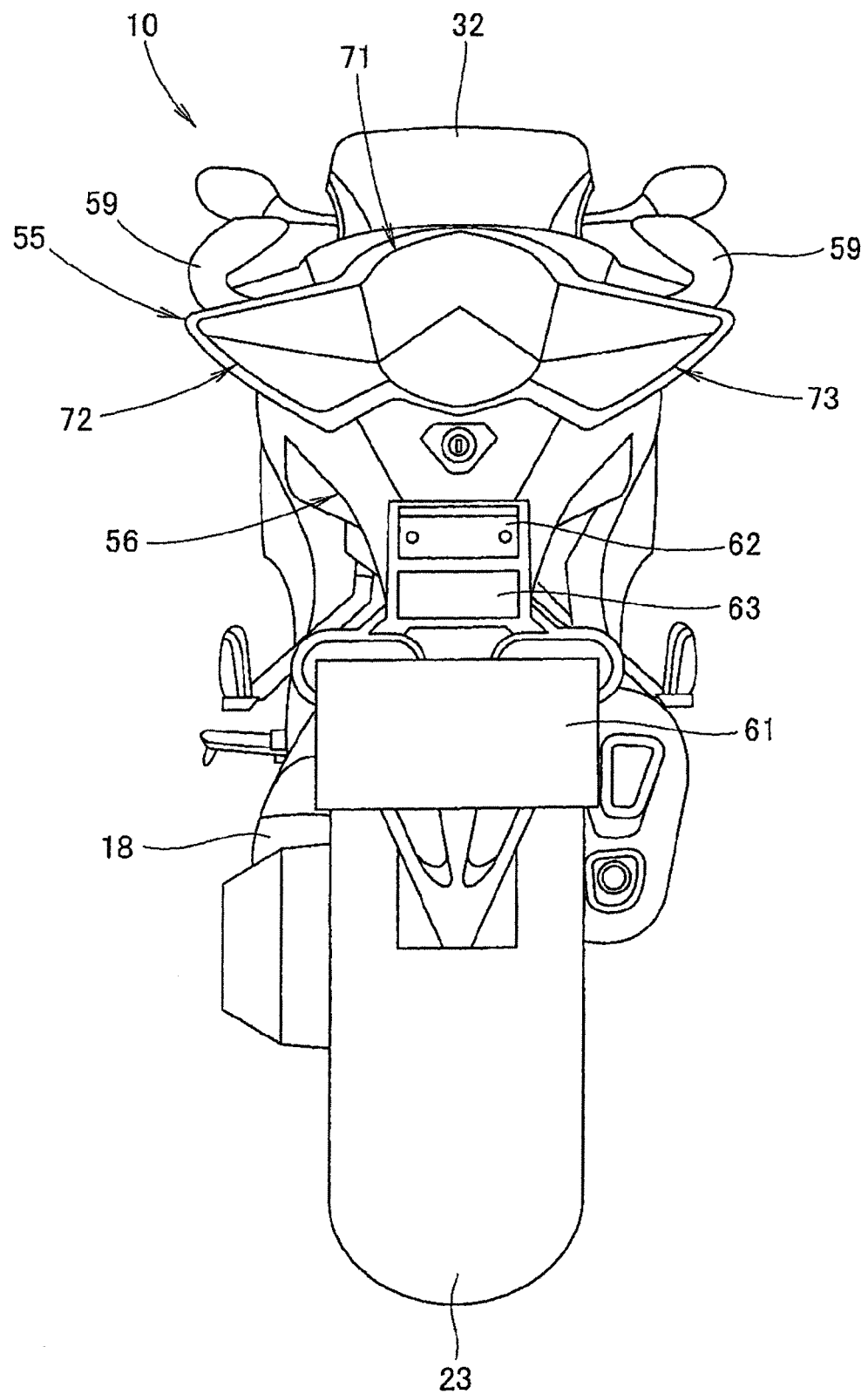
FIG. 2 is a rear view of the motorcycle according to an embodiment of the present invention.

As shown in FIG. 2, the rear combination lamp 55 can be a large lighting device having an integrated structure in which a tail lamp 71 is disposed. Tail lamp 71 may be disposed in a central portion of the structure and also serve as a break lamp, and can be combined with rear turn signal lamps 72, 73 disposed on both sides of the tail lamp 71.

Below the rear combination lamp 55, the license plate lamp 62, the reflex reflector 63, and the license plate 61, which are attached to the rear fender 56, are sequentially disposed from the top. The license plate 61 is illuminated with the license plate lamp 62. Light incident on the reflex reflector 63 is reflected in a direction almost identical to that of the incidence. Note that the reference numeral 75 denotes a muffler constituting an exhaust device connected to the engine 16.

Figure 3:
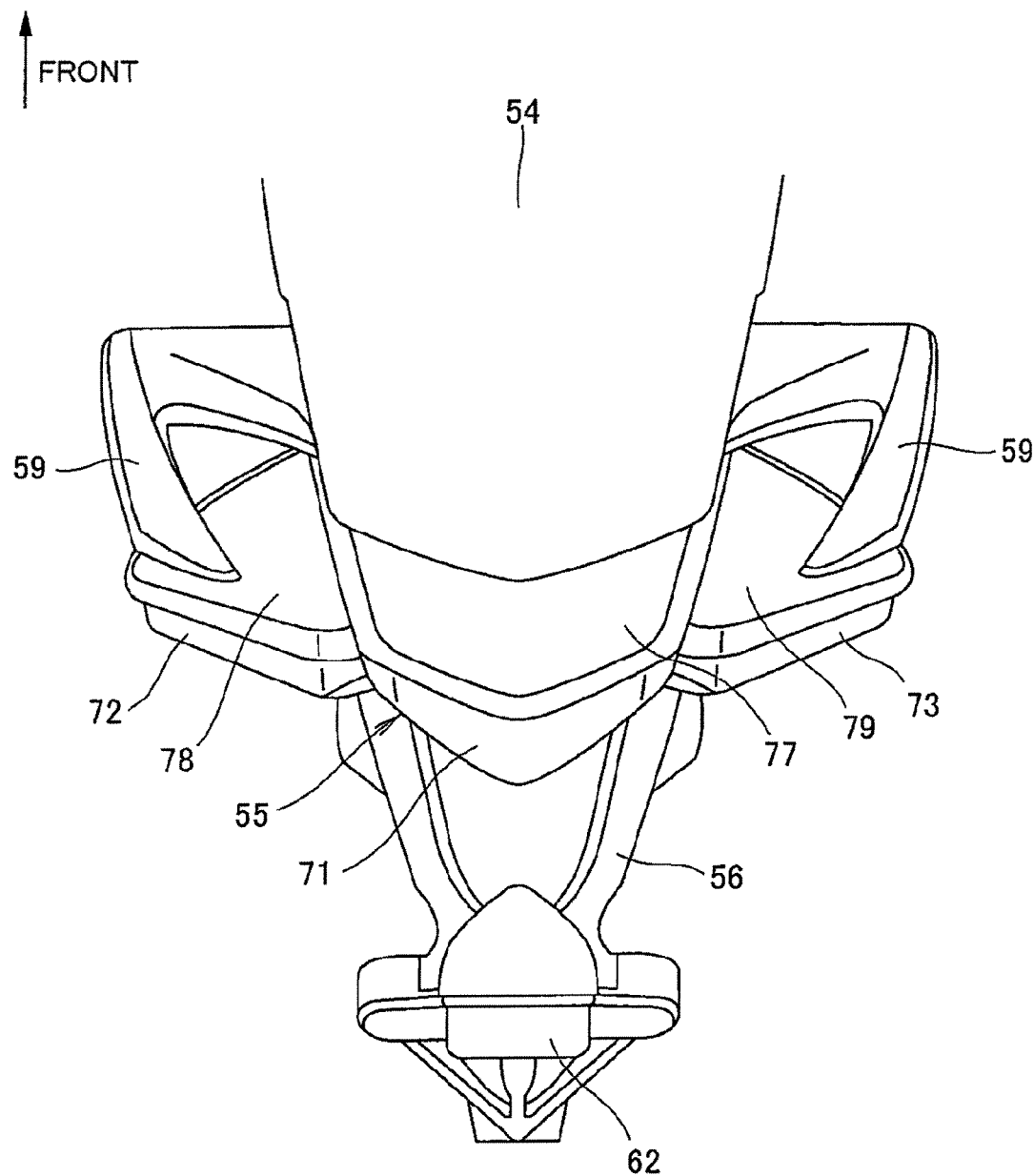
FIG. 3 is a rear plan view of the motorcycle according to an embodiment of the present invention.

As shown in FIG. 3, the rear combination lamp 55 may be an integrated body obtained by connecting the tail lamp 71 projecting rearwardly in a V-shape and the rear turn signal lamps 72, 73 projecting to the left and to the right, respectively. A rear center cover 77 covers a portion which is rearward of the seat 54 and which is above the tail lamp 71. Rear side covers 78, 79 cover upper portions of the rear turn signal lamps 72, 73, respectively.

Figure 4:
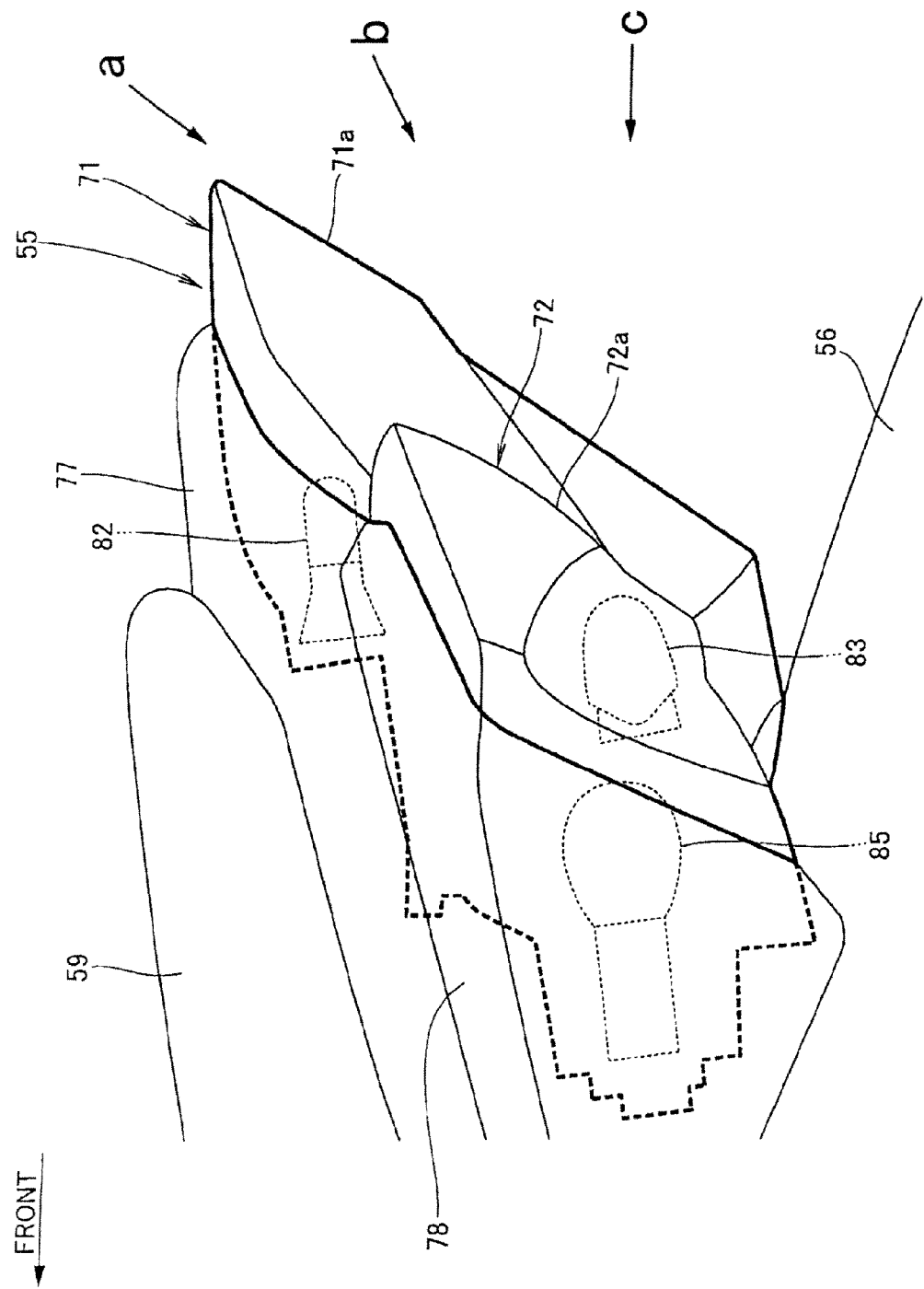
FIG. 4 is a rear side view of the motorcycle according to an embodiment of the present invention.

In FIG. 4, the heavy solid line shows a contour of an exposed portion of the rear combination lamp 55, and the heavy dashed line shows a contour of a portion covered with the rear fender 56, the rear center cover 77, and the rear side covers 78, 79 (only the reference numeral 78 on the near side is shown).

An exposed portion of the tail lamp 71 is formed to project obliquely rearwardly and upwardly. A back surface 71a of the tail lamp 71 (back surfaces of a cut-lens portion and a clear lens portion to be described below) is inclined upwardly and rearwardly. In the tail lamp 71, a tail lamp bulb 82 is attached to an upper portion of the tail lamp 71. A tail/stop lamp bulb 83 serving as both a tail lamp bulb and a stop lamp bulb is attached to a lower portion of the tail lamp 71.

An exposed portion of the rear turn signal lamps 72, 73 (only the reference numeral 72 on the near side is shown) is disposed obliquely frontward and downward of the tail lamp 71, and formed to project obliquely rearwardly and upwardly as in the case of the tail lamp 71. Back surfaces 72a, 73a (only the reference numeral 72a on the near side is shown) of the rear turn signal lamps 72, 73 are inclined upwardly and rearwardly. In the rear turn signal lamps 72, 73, turn signal lamp bulbs 85, 86 (only the reference numeral 85 on the near side is shown) are attached frontward of the tail/stop lamp bulb 83.

Figure 5:
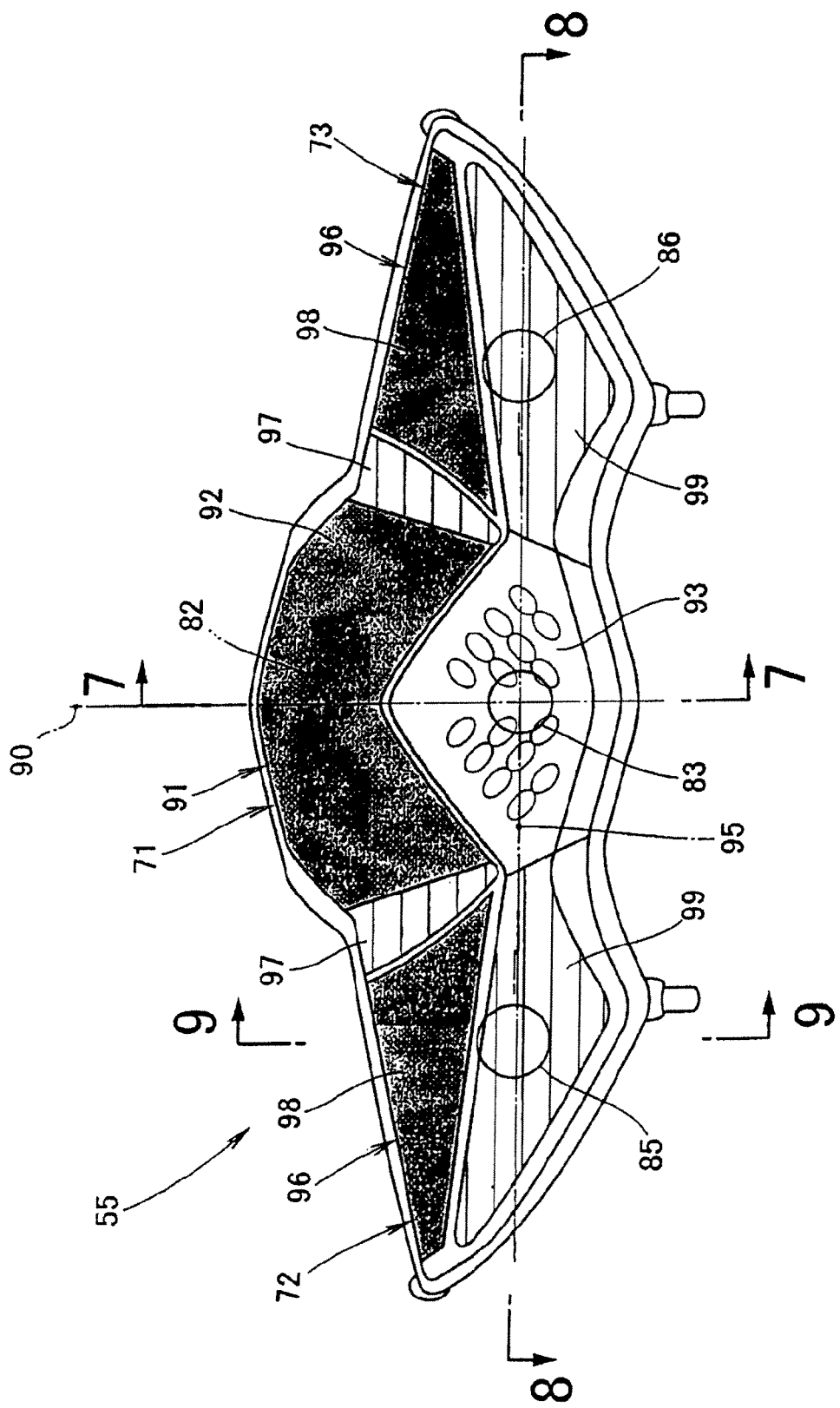
FIG. 5 is a rear view of a rear lighting device according to an embodiment of the present invention.

As shown in FIG. 5, the tail lamp 71 is bilaterally symmetrical about a vehicle body center line 90 extending vertically through the center of the vehicle body in the vehicle width direction. The tail lamp bulb 82 and the tail/stop lamp bulb 83 are disposed on the vehicle body center line 90.

A lens 91 constituting the tail lamp 71 includes a cut-lens portion 92 in an upper half portion thereof, and a transparent clear lens portion 93 in a lower half portion thereof. In an inner surface of the cut-lens portion 92, projections and depressions which cause diffuse reflection are formed. The tail lamp bulb 82 is disposed inward of the cut-lens portion 92, and the tail/stop lamp bulb 83 is disposed inward of the clear lens portion 93.

The cut-lens portion 92 is long in the lateral direction, and includes a belt-like portion curved to be convex upward. The clear lens portion 93 is a sword tip-like portion projecting upward in a mountain-like shape.

The rear turn signal lamps 72, 73 are bilaterally symmetrical about the vehicle body center line 90. The turn signal lamp bulbs 85, 86 are disposed on a horizontal line 95 passing through the center of the tail/stop lamp bulb 83 of the tail lamp 71 and extending horizontally.

Lenses 96, 96 constituting the rear turn signal lamps 72, 73 are each provided with a clear lens portion 97 and a cut-lens portion 98 which are located in an upper half portion of the lens 96, and with a clear lens portion 99 in a lower half portion thereof. The clear lens portion 97 is triangular and adjacent to the cut-lens portion 92 of the tail lamp 71. The cut-lens portion 98 is triangular and extends outwardly from the clear lens portion 97 with its height gradually reduced. In an inner surface of the cut-lens portion 98, projections and depressions which cause diffuse reflection are formed. The clear lens portion 99 has a substantially-inverted-triangular shape in its lower half portion, and has an inner end portion, in the vehicle width direction, continuous to the clear lens portion 93 of the tail lamp 71.

The clear lens portion 97 is cut in a horizontal direction. Accordingly, the clear lens portion 97 is transparent, and has a function of slightly diffusing light from the turn signal lamp bulbs 85, 86.

As in the case of the clear lens portion 97, the clear lens portion 99 is transparent and is cut in the horizontal direction for the purpose of slightly diffusing light from the turn signal lamp bulbs 85, 86.

The turn signal lamp bulbs 85, 86 are disposed inside the clear lens portion 99.

Figure 6:
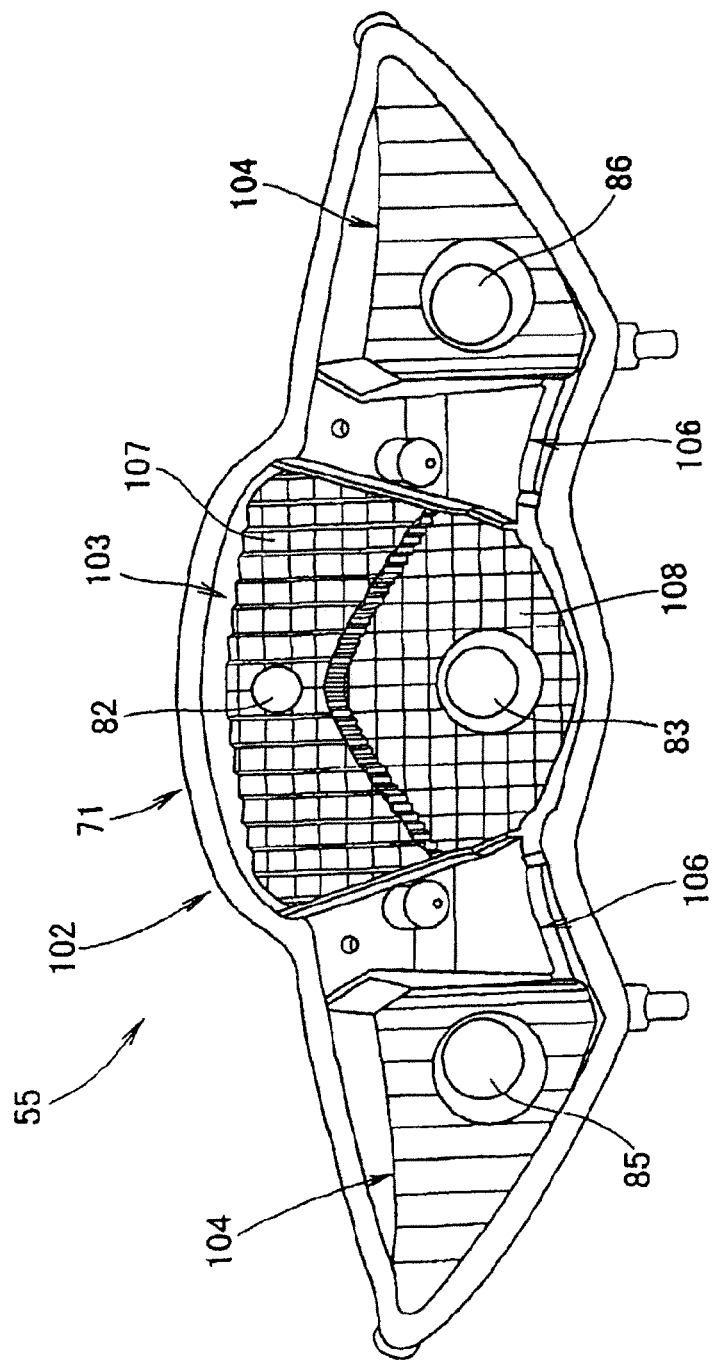
FIG. 6 is a rear view showing a state where a lens is detached from the rear lighting device according to an embodiment of the present invention.

As shown in FIG. 6, a reflector 102 constituting the rear combination lamp 55 includes a tail lamp reflector portion 103, turn signal lamp reflector portions 104, 104, and intermediate reflector portions 106, 106. The tail lamp reflector portion 103 constitutes a part of the tail lamp 71. The turn signal lamp reflector portions 104, 104 constitute parts of the rear turn signal lamps 72, 73. The intermediate reflector portions 106, 106 are provided between the tail lamp reflector portion 103 and each of the turn signal lamp reflector portions 104, 104.

The tail lamp reflector portion 103 further includes an upper reflector portion 107 and a lower reflector portion 108. The upper reflector portion 107 reflects light from the tail lamp bulb 82, and the lower reflector portion 108 reflects light from the tail/stop lamp bulb 83.

Figure 7:
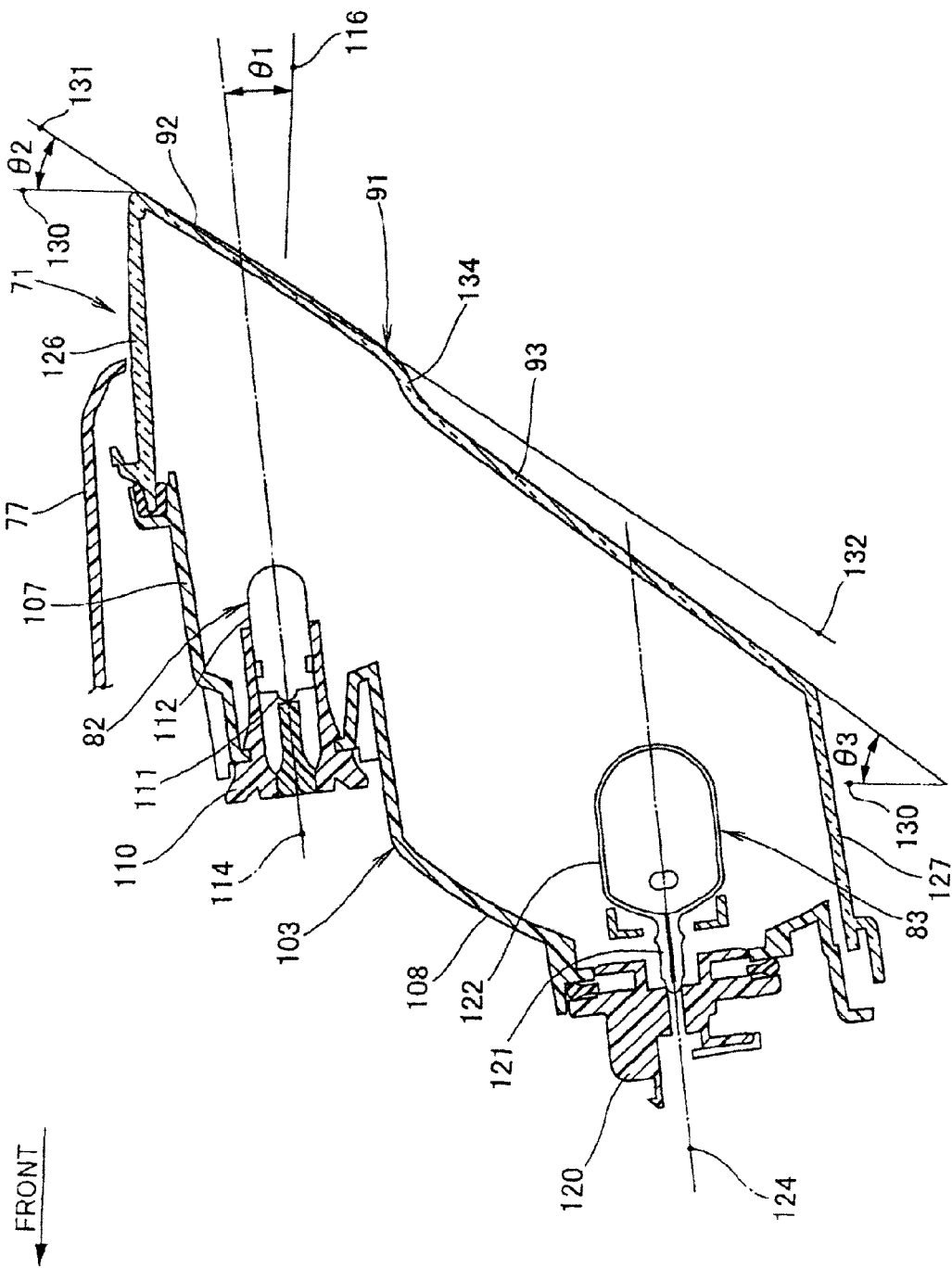
FIG. 7 is a cross-sectional view taken along the line 7-7 of FIG. 5.

As shown in FIG. 7, the tail lamp 71 includes the tail lamp reflector portion 103, the tail lamp bulb 82, the tail/stop lamp bulb 83, and the lens 91. The tail lamp bulb 82 and the tail/stop lamp bulb 83 are attached to the tail lamp reflector portion 103. The lens 91 is disposed reward of the tail lamp bulb 82 and the tail/stop lamp bulb 83, and attached to the tail lamp reflector portion 103 (in other wards, the reflector 102 (refer to FIG. 6)).

The tail lamp bulb 82 includes a base 111, a glass bulb 112, and a filament (not shown). The base 111 may be made of glass and supported by a socket 110 detachably attached to the tail lamp reflector portion 103 (specifically, the upper reflector portion 107). The glass bulb 112 is integrally formed with the base 111. The filament is provided in the glass bulb 112.

A reference axis 114 passing through the centers of the base 111 and the glass bulb 112 of the tail lamp bulb 82 is inclined upwardly and rearwardly by an angle θ1 with respect to a horizontal line 116 extending in a front-rear direction of the vehicle body.

The tail/stop lamp bulb 83 includes a base 121, a glass bulb 122, and two filaments (not shown). The base 121 may be made of glass, and supported by a socket 120 detachably attached to the tail lamp reflector portion 103 (specifically, the lower reflector portion 108). The glass bulb 122 is integrally formed with the base 121. The two filaments are provided in the glass bulb 122 for a tail lamp and for a stop lamp.

A reference axis 124 passing through the centers of the base 121 and the glass bulb 122 of the tail/stop lamp bulb 83 is in parallel with the reference axis 114 of the tail lamp bulb 82.

In the lens 91, both the cut-lens portion 92 and the clear lens portion 93 are inclined obliquely rearwardly and upwardly. Note that the reference numeral 126 denotes an upper flat portion formed in an upper portion of the lens 91, and the reference numeral 127 denotes a lower flat portion formed in a lower portion of the lens 91.

The cut-lens portion 92 is slightly curved to be convex rearward. Here, an inclination angle θ2 of a straight line 131 that connects an upper end and a lower end of the cut-lens portion 92, with respect to a vertical line 130, is taken as an inclination angle of the cut-lens portion 92 (specifically, the back surface 71a of the cut-lens portion 92 (refer to FIG. 4)).

The clear lens portion 93 is located frontward of an extension line of the cut-lens portion 92, i.e., an extension line 132 of the straight line 131. When θ3 represents an inclination angle of the clear lens portion (specifically, the back surface 71a of the clear lens portion 93 (refer to FIG. 4)) with respect to the vertical line 130, the inclination angle θ3 of the clear lens portion 93 is smaller than the inclination angle θ2 of the cut-lens portion 92 (θ3<θ2). Note that the reference numeral 134 denotes a step portion provided in an upper edge portion of the clear lens portion 93 in such a manner as to form a boundary between the cut-lens portion 92 and the clear lens portion 93.

Figure 8:
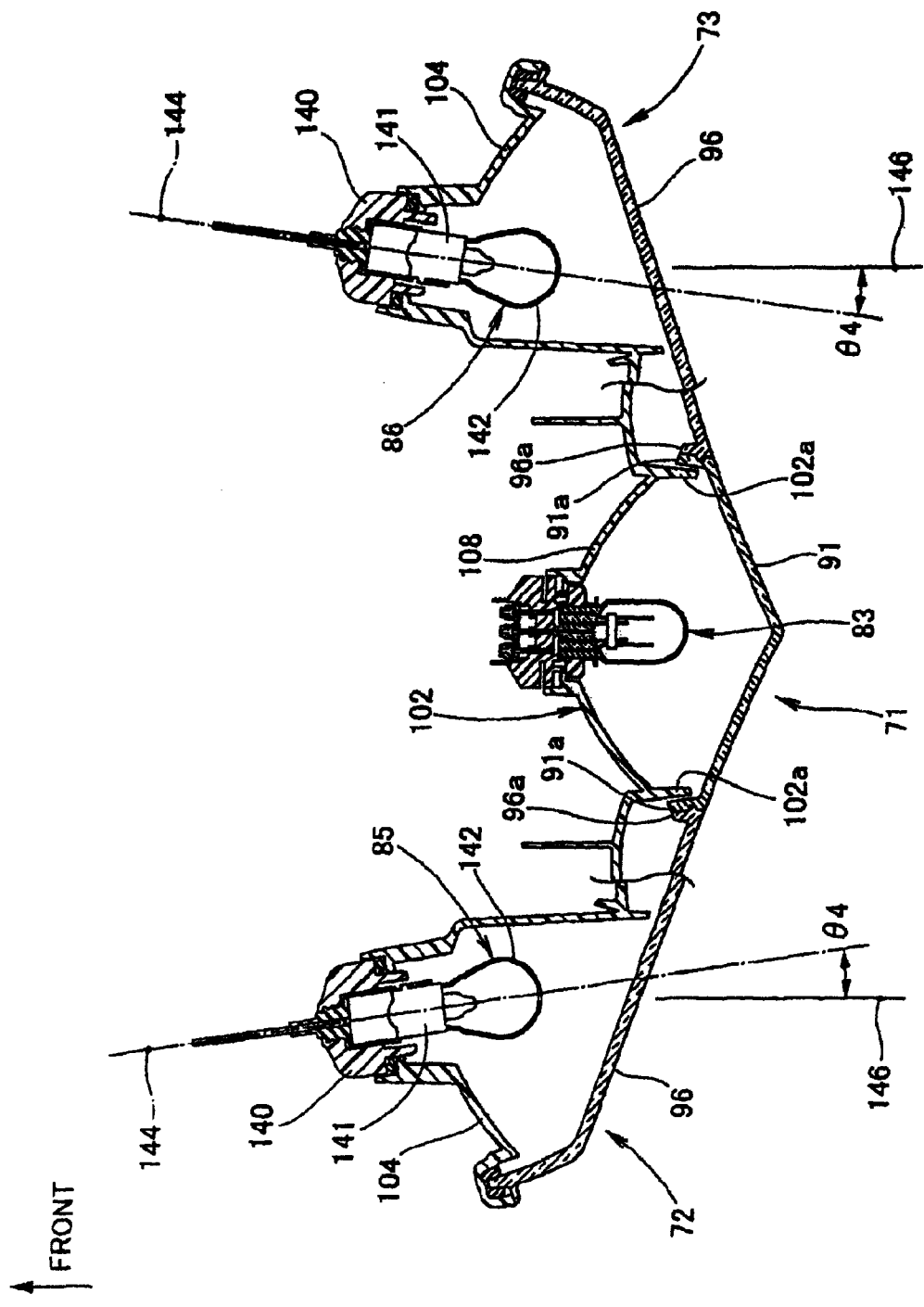
FIG. 8 is a cross-sectional view taken along the line 8-8 of FIG. 5.

As shown in FIG. 8, each of the turn signal lamp bulbs 85, 86 includes a base 141, a glass bulb 142, and a filament (not shown). The base 141 is supported by a socket 140 detachably attached to the corresponding one of the turn signal lamp reflector portions 104, 104. The glass bulb 142 is attached to the base 141. The filament is provided in the glass bulb 142.

Each reference axis 144, 144 passes through the centers of the base 141 and the glass bulb 142 of the corresponding one of the turn signal lamp bulbs 85, 86. The reference axes 144, 144 are inclined by angles θ4, θ4 with respect to straight lines 146, 146, which extend in a front-rear direction of the vehicle body, respectively, in such a manner as to become closer to each other toward the rear of the vehicle.

The lens 91 of the tail lamp 71 projects rearwardly in a V-shape. The lenses 96, 96 of the rear turn signal lamps 72, 73 extend laterally and obliquely frontward like left and right extensions of the lens 91.

The lens 91 is joined to the lenses 96, 96 at frontward extension portions 91a, 91a, which are formed in both end portions of the lens 91, and frontward extension portions 96a, 96a respectively formed in inner end portions of the lenses 96, 96. Rearward extension portions 102a, 102a integrally formed with the reflector 102 are disposed close to inner sides of left and right joined portions of the lens 91 and the lenses 96, 96.

Figure 9:
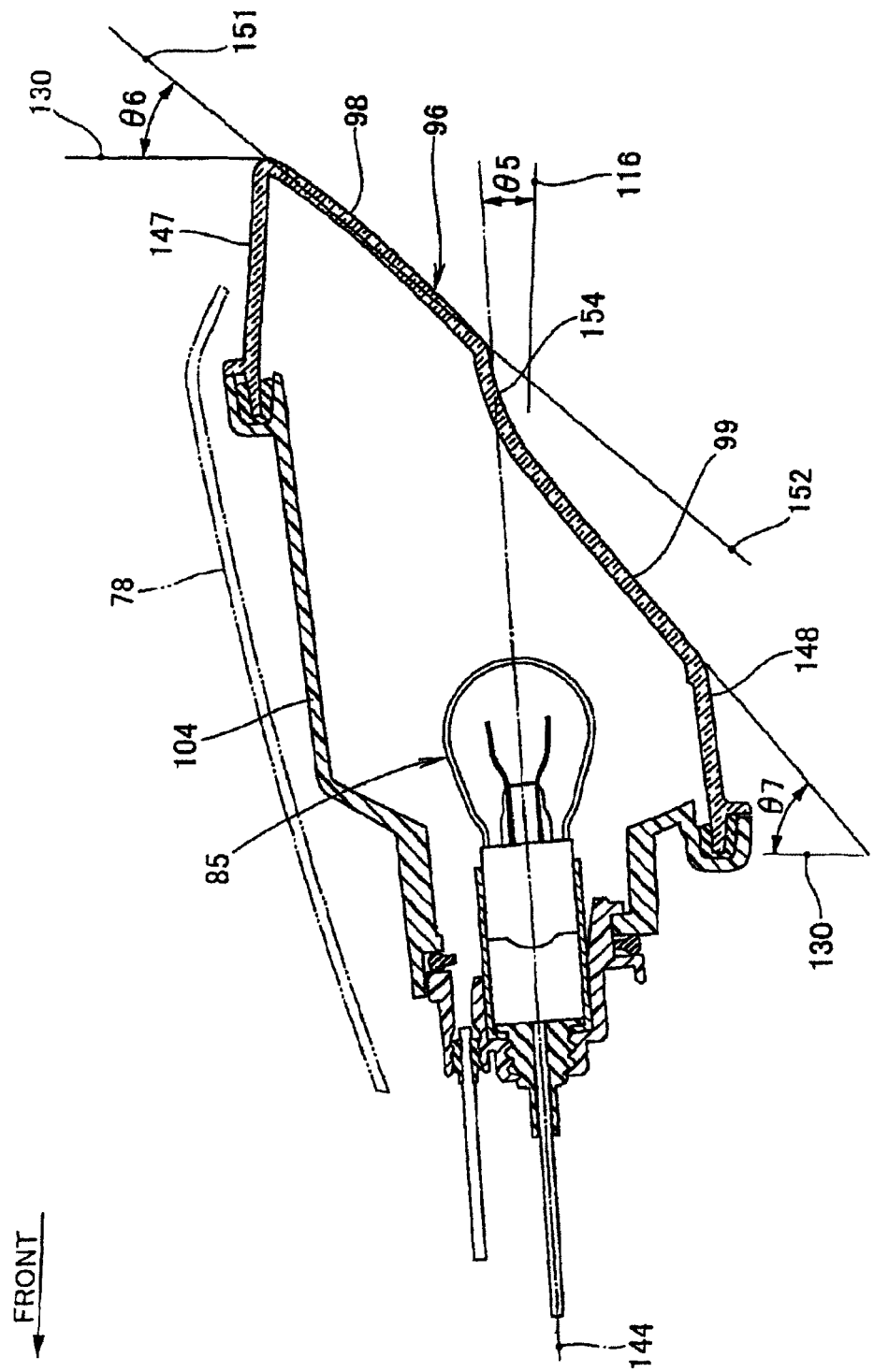
FIG. 9 is a cross-sectional view taken along the line 9-9 of FIG. 5.

As shown in FIG. 9, the rear turn signal lamp 72 includes the turn signal lamp reflector portion 104, the turn signal lamp bulb 85, and the lens 96. The turn signal lamp bulb 85 is attached to the turn signal lamp reflector portion 104. The lens 96 is disposed rearward of the turn signal lamp bulb 85, and attached to the turn signal lamp reflector portion 104.

The reference axis 144 of the turn signal lamp bulb 85 is inclined upwardly and rearwardly by an angle θ5 with respect to the horizontal line 116 extending in the front-rear direction of the vehicle body.

In the lens 96, both the cut-lens portion 98 and the clear lens portion 99 are inclined obliquely rearwardly and upwardly. Note that the reference numeral 147 denotes an upper flat portion integrally formed in an upper portion of the lens 96, and the reference numeral 148 denotes a lower flat portion integrally formed in a lower portion of the lens 96. Inner surfaces of the upper flat portion 147 and the lower flat portion 148 are subjected to a process for producing projections and depressions for causing diffuse reflection.

The cut-lens portion 98 is slightly curved to be convex rearward. An inclination angle θ6 of a straight line 151, which connects an upper end and a lower end of a back surface of the cut-lens portion 98, with respect to the vertical line 130 is taken as an inclination angle of the cut-lens portion 98 (i.e., the back surface 72a of the cut-lens portion 98 (refer to FIG. 4)).

The clear lens portion 99 is located frontward of an extension line of the cut-lens portion 98, i.e., an extension line 152 of the straight line 151. When θ7 represents an inclination angle of the clear lens portion 99 (i.e., the back surface 72a of the clear lens portion 99 (refer to FIG. 4)) with respect to the vertical line 130, the inclination angle θ7 of the clear lens portion 99 is smaller than the inclination angle θ6 of the cut-lens portion 98 (θ7<θ6).

Note that the reference numeral 154 denotes a step portion provided in an upper edge portion of the clear lens portion 99 in such a manner as to form a boundary between the cut-lens portion 98 and the clear lens portion 99.

The rear turn signal lamp 73 (refer to FIG. 5) has a structure similar to that of the rear turn signal lamp 72 described above.

It should be noted that, although the term bulb or lamp is used throughout this specification, this term is meant to include any appropriate light or lamp source, such as incandescent bulbs, halogen lamps, xenon lamps, and any other appropriate illumination technology.

An operation of the above-described rear combination lamp 55 will be described below.

Figure 10:
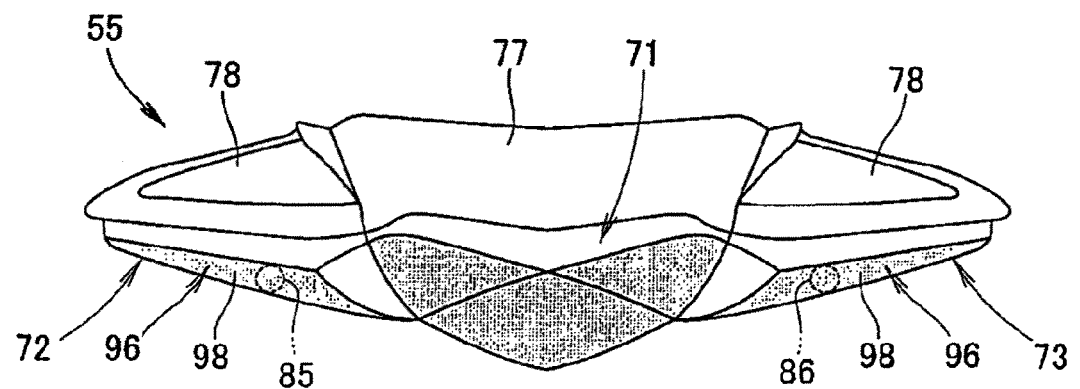
FIG. 10 is a view showing an operation of the structure of a rear lighting device according to an embodiment of the present invention.
Figure 10:
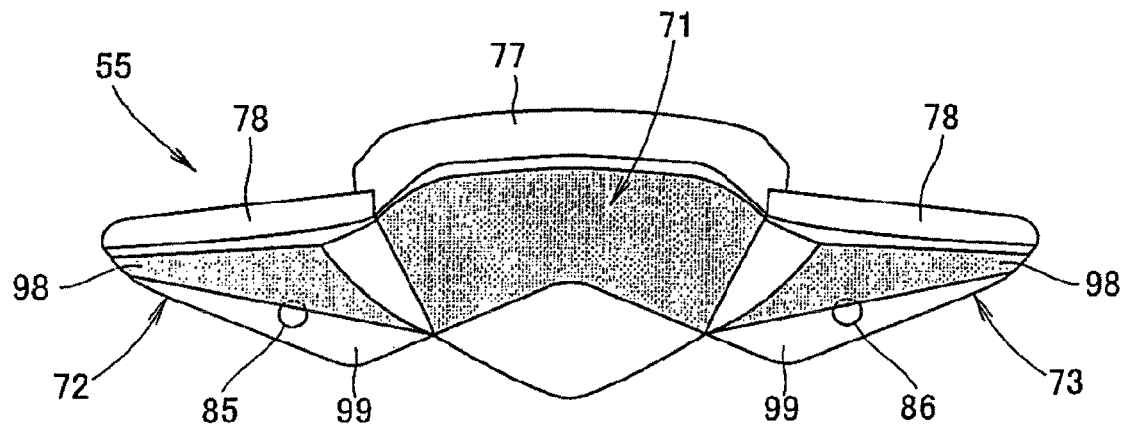
Figure 10:
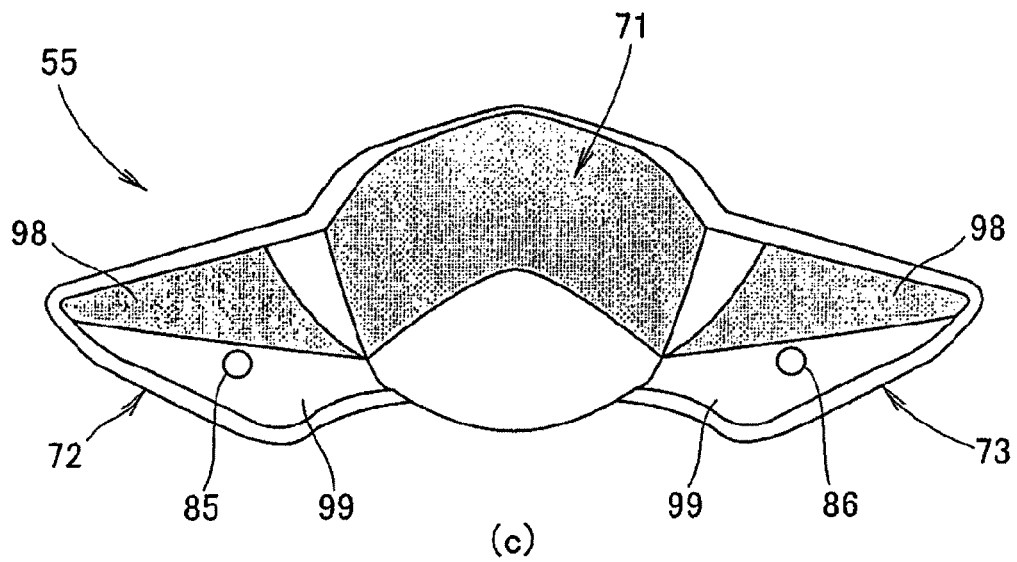

FIG. 10(a) is a view seen in a direction of the arrow a of FIG. 4, and shows the rear combination lamp 55 viewed by a person located rearward of the motorcycle (for example, at a position 3m rearward thereof).

Specifically, when the rear turn signal lamps 72, are viewed obliquely from above, only the cut-lens portions 98, 98 are visible, out of the cut-lens portions 98, 98 and the clear lens portions 99, 99 (refer to FIG. 5) constituting the lenses 96, 96 inclined upwardly and rearwardly. Accordingly, the turn signal lamp bulbs 85, 86 are visible through the cut-lens portions 98, 98.

Since light from the turn signal lamp bulbs 85, 86 is reflected diffusely by the cut-lens portions 98, 98, the intensity of the light gets weaker. Accordingly, the glare from the turn signal lamp bulbs 85, 86 reaches a person's eye at a reduced level, and a favorable visual impression is given.

Moreover, since the heights of the tail lamp 71 and the rear turn signal lamps 72, 73 are made small, a slim and simple impression is obtained.

FIG. 10(b) is a view seen in a direction of the arrow b of FIG. 4, and shows the rear combination lamp 55 viewed by a person located rearward of the motorcycle (for example, at a position 5m rearward thereof).

In this case, the rear turn signal lamps 72, 73 are viewed obliquely from slightly below in comparison with the case of FIG. 10(a). Light from the turn signal lamp bulbs 85, 86 of the rear turn signal lamps 72, 73 is visible through the cut-lens portion 98 and the clear lens portion 99.

Even when a part of light from the rear turn signal lamps 72, 73 passes through the clear lens portion 99, light from the turn signal lamp bulbs 85, 86 does not look glaring because the distance from the rear turn signal lamps 72, 73 to a person's eye is greater than that in the case of FIG. 10(a).

FIG. 10(c) is a view seen in a direction of the arrow c of FIG. 4, and shows the rear combination lamp 55 viewed substantially horizontally by a driver on a vehicle rearward of the motorcycle 10.

Since light from the turn signal lamp bulbs 85, 86 of the rear turn signal lamps 72, 73 are visible through the clear lens portion 99, the light is emitted strongly and rearwardly. Accordingly, the visibility of the rear turn signal lamps 72, 73 can be improved.

As shown in FIGS. 1, 5, 7 and 9, the structure of a rear lighting device for a motorcycle may include the reflector 102, the bulbs (the tail lamp bulb 82, the tail/stop lamp bulb 83, and the turn signal lamp bulbs 85, 86) attached to the reflector 102, and the lenses 91, 96, 96 disposed rearward of these bulbs 82, 83, 85, 86 and attached to the reflector 102. The structure of a rear lighting device for a motorcycle is such that, in a state where the rear combination lamp 55 as a rear lighting device is attached to the motorcycle 10, the lenses 91, 96, are provided to be inclined obliquely upwardly and rearwardly. The cut-lens portions 92, 98, 98 as a uniform-light-emission design surface are formed in the upper half portions of the lenses 91, 96, 96, by subjecting the upper half portions of the lenses 91, 96, 96 to a process for producing projections and depressions extending in the vehicle width direction, and the clear lens portions 93, 99, 99 as a clear lens surface are formed in the lower half portions of the lenses 91, 96, 96 to be disposed frontward, in a vehicle body, of extension lines 132, 152 of the cut-lens portions 92, 98, 98.

With the above-described structure, when a person in rear of the motorcycle 10 views the rear combination lamp 55 obliquely from above, the cut-lens portions 92, 98, in the upper half portions of the lenses 91, 96, 96 become more visible, and the clear lens portions 93, 99, 99 in the lower half portions of the lenses 91, 96, 96 become less visible. As a result, the light from the bulbs (the tail/stop lamp bulb 83, and the turn signal lamp bulbs 85, 86) is recognized in such a way that most of the light is uniformly emitted through the cut-lens portions 92, 98, 98, and the appearance of the rear combination lamp 55 can be improved.

Moreover, when a person views the rear combination lamp 55 obliquely from above, the height of the rear combination lamp 55 looks small. Accordingly, the rear combination lamp 55 is recognized as having a slim and simple design formed exclusively of the cut-lens portions 92, 98, 98. Hence, the marketability of the rear combination lamp 55 can be improved.

Furthermore, when a person on a vehicle in the rear of the motorcycle 10 views the rear combination lamp 55, the rear combination lamp 55 is viewed substantially horizontally. Accordingly, strong light from the bulbs (the tail/stop lamp bulb 83, the turn signal lamp bulbs 85, 86) is recognizable through the clear lens portions 93, 99, 99 of the lenses 91, 96, 96 in the rear combination lamp 55. Thus, the visibility of the rear combination lamp 55 can be improved.

As shown in the above-described FIG. 10(c), when viewed horizontally from rear of the motorcycle 10, the bulbs (the tail/stop lamp bulb 83, the turn signal lamp bulbs 85, 86) are visible through the clear lens portions 93, 99, 99. Accordingly, light emission from the bulbs is visible through the clear lens portions 93, 99, 99, and thus the visibility of the rear combination lamp 55 can be improved.

As shown in the above-described FIG. 5 and FIG. 8, the rear combination lamp 55 includes the pair of left and right rear turn signal lamps 72, 73 provided in a rear portion of the vehicle body integrally with the tail lamp 71. The cut-lens portions 99, 99 of the rear turn signal lamps 72, 73 are formed in such a manner that the height thereof is gradually increased from side portions of the vehicle body to the center portion of the vehicle body, and the reference axes 144, 144 of the bulbs (the turn signal lamp bulbs 85, 86) are inclined in such a manner as to become closer to the center portion of the vehicle body toward the rear of the vehicle body. Accordingly, although the cut-lens portions 98, 98 are formed in the vehicle width direction, the area of the cut-lens portions 98, 98 is made larger on the center side of the vehicle body, and the light from the bulbs (the turn signal lamp bulbs 85, 86) is directed more to the center portion of the vehicle body. As a result, the visibility of the rear turn signal lamps 72, 73 from rear can be improved.

As shown in the above-described FIGS. 7 and 9, the clear lens portions 93, 99, 99 are inclined more gently than the cut-lens portions 92, 98, 98. Accordingly, the clear lens portions 93, 99, 99 become less visible when viewed obliquely from rear and above. For this reason, the cut-lens portions 92, 98, 98 in the upper half portions of the lenses 91, 96, 96 can be emphasized, and a distinct slim impression of the rear combination lamp 55 can be offered.

As shown in the above-described FIG. 5, the rear combination lamp 55 includes the tail lamp 71 between the left and right rear turn signal lamps 72, 73. The cut-lens portion 92 provided to the tail lamp 71 is formed in the upper half portion of the lens 91 in such a manner as to extend from sides closer to the cut-lens portions 98, 98, which are provided to the left and right rear turn signal lamps 72, 73, to the center portion of the vehicle body. When viewed horizontally from rear of the cut-lens portion 92 of the tail lamp 71, the cut-lens portion 92 of the tail lamp 71 has a belt-like shape curved to be convex upward, and is provided above the tail/stop lamp bulb 83 provided to the tail lamp 71. The tail/stop lamp bulb 83 may also serve as a stop lamp bulb, and the clear lens portion 93 provided to the tail lamp 71 can be disposed rearward of the tail/stop lamp bulb 83.

With the above-described structure, the cut-lens portion 92 of the tail lamp 71 is formed in the upper half portion of the lens 91 in such a manner as to extend from the cut-lens portions 98, 98 of the left and right rear turn signal lamps 72, 73 to the center portion of the vehicle body. Accordingly, when a rear portion of the vehicle body is viewed obliquely from above, the cut-lens portions 98, 98 of the rear turn signal lamps 72, 73 and the cut-lens portion 92 of the tail lamp 71 can look laterally continuous. As a result, a design of the combination lamp 55 can be provided such that the heights of the left and right rear turn signal lamps 72, 73 are gradually reduced toward the sides of the vehicle body, and the left and right rear turn signal lamps 72, 73 are connected to each other with a portion interposed therebetween, the portion having a similar height. This attractive appearance improves marketability of the vehicle.

As shown in the above-described FIGS. 5 and 7, the tail lamp bulb 82 is provided at a position which is located frontward, on the center side of the vehicle body, of the cut-lens portion 92 of the tail lamp 71 and which is above the tail/stop lamp bulb 83. The tail/stop lamp bulb 83 is disposed on the horizontal line 95 passing through the left and right turn signal lamp bulbs 85, 86 and extending in the vehicle width direction. Accordingly, when simultaneously turned on, the left and right turn signal lamp bulbs 85, 86 and the tail/stop lamp bulb 83 tend to be recognized as being located at the same level, and can be recognized easily.

As shown in the above-described FIG. 9, the clear lens portion 93 of the tail lamp 71 is located frontward of the extension line 152 of the cut-lens portion 92 in the tail lamp 71. Accordingly, the visibility of the cut-lens portion 92 in the tail lamp 71 at the time when the tail lamp 71 is viewed obliquely from rear and above can also be improved as in the case of the left and right rear turn signal lamps 72, 73.

Note that, in this embodiment, the clear lens portion 97 is provided between the cut-lens portion 92 of the rear combination lamp 55 and each of the cut-lens portions 98 of the rear combination lamp 55, as shown in FIG. 5. However, the structure is not limited thereto. Alternatively, the cut-lens portion 92 and the cut-lens portion 98 may be provided continuous to each other without providing the clear lens portion 97.

According to one embodiment, the lens is configured to be inclined obliquely upwardly and rearwardly. The uniform-light-emission design surface is formed in the upper half portion of the lens by subjecting the upper half portion to the process for producing projections and depressions extending in the vehicle width direction. The clear lens surface is formed in the lower half portion of the lens to be disposed frontward, in the vehicle body, of the extension line of the uniform-light-emission design surface. Accordingly, when a person in rear of the motorcycle views the rear lighting device obliquely from above, the uniform-light-emission design surface in the upper half portion of the lens becomes more visible, and the clear lens surface in the lower half portion of the lens becomes less visible. As a result, the light from the bulb is recognized in such a way that most of the light is uniformly emitted through the uniform-light-emission design surface. As a result, the appearance of the rear lighting device can be improved.

Moreover, when a person views the rear lighting device obliquely from above, the height of the rear lighting device looks small. Accordingly, the rear lighting device is recognized as having a slim and simple design formed exclusively of the uniform-light-emission design surface. Hence, the marketability of the rear lighting device can be improved.

Furthermore, when a person on a vehicle in rear of the motorcycle views the rear lighting device, the rear lighting device is viewed substantially horizontally. Accordingly, strong light from the bulb is recognizable through the clear lens surface of the lens in the rear lighting device, and thus the visibility of the rear lighting device can be improved.

According to another embodiment, the bulb is visible through the clear lens surface when viewed horizontally from rear of the motorcycle. Accordingly, during driving of the vehicle, the rear lighting device is viewed substantially horizontally from a vehicle in rear of the own vehicle. As a result, light emission from the bulb is visible thorough the clear lens surface, and thus the visibility of the rear lighting device can be improved.

According to one embodiment, the rear lighting device includes the pair of left and right turn signal lamps provided in a rear portion of the vehicle body integrally with the tail lamp. The uniform-light-emission design surface is formed in such a manner that the height thereof is gradually increased from the side portions of the vehicle body to the center portion of the vehicle body, and the reference axis of the bulb is inclined in such a manner as to become closer to the center portion of the vehicle body toward a rear of the vehicle body. Accordingly, although the uniform-light-emission design surface wide in the vehicle width direction is formed, the area of the uniform-light-emission design surface is made larger on the center side of the vehicle body, and the light from the bulb is directed more to the center portion of the vehicle body. As a result, the visibility of the rear turn signal lamps from rear can be improved.

According to another embodiment, the clear lens surface is inclined more gently than the uniform-light-emission design surface. Accordingly, the clear lens surface becomes less visible when viewed obliquely from rear and above. For this reason, the uniform-light-emission design surface in the upper half portion of the lens can be emphasized, and a distinct slim impression of the rear lighting device can be offered.

According to another embodiment, the rear lighting device includes the tail lamp between the left and right turn signal lamps. The part of the uniform-light-emission design surface provided to the tail lamp is formed in the upper half portion of the lens in such a manner as to extend from the sides closer to the parts of the uniform-light-emission design surface, which are provided to the left and right turn signal lamps, to the center portion of the vehicle body. When viewed horizontally from rear of the uniform-light-emission design surface, the part of the uniform-light-emission design surface of the tail lamp has the belt-like shape curved to be convex upward, and is provided above the tail/stop lamp bulb provided to the tail lamp, the tail/stop lamp bulb serving also as a stop lamp bulb, and the part of the clear lens surface provided to the tail lamp is disposed rearward of the tail/stop lamp bulb. Accordingly, since the part of the uniform-light-emission design surface of the tail lamp is formed in the upper half portion of the lens in such a manner as to extend from the parts of the uniform-light-emission design surface of the left and right turn signal lamps to the center portion of the vehicle body. When a rear portion of the vehicle body is viewed obliquely from above, the parts of the uniform-light-emission design surface of the turn signal lamps and the part of the uniform-light-emission design surface of the tail lamp can be look laterally continuous. As a result, a design of the combination lamp can be provided such that the heights of the left and right turn signal lamps are gradually reduced toward the sides of the vehicle body, and the left and right turn signal lamps are connected to each other with a portion interposed therebetween, the portion having a similar height. This attractive appearance improves the marketability of the vehicle.

According to another embodiment, the tail lamp bulb is provided at a position which is located frontward, on the center side of the vehicle body, of the part of the uniform-light-emission design surface of the tail lamp and which is above the tail/stop lamp bulb. The tail/stop lamp bulb is disposed on the horizontal line passing through the left and right turn signal lamp bulbs and extending in the vehicle width direction. Accordingly, when simultaneously turned on, the left and right turn signal lamp bulbs and the tail/stop lamp bulb tend to be recognized as being located at the same level, and can be recognized more easily.

Moreover, when the intensities of emission from the parts of the uniform-light-emission design surface of the left and right turn signal lamp bulbs and the tail/stop lamp bulb are adjusted to be perceived at the same level, a more united light emission can be achieved.

According to another embodiment, the part of the clear lens surface of the tail lamp is located frontward of the extension line of the part of the uniform-light-emission design surface of the tail lamp. Accordingly, the visibility of the part of the uniform-light-emission design surface of the tail lamp can also be improved as in the case of the left and right turn signal lamps.

DESCRIPTION OF REFERENCE NUMERALS

10 MOTORCYCLE
55 REAR LIGHTING DEVICE (REAR COMBINATION LAMP)
71 TAIL LAMP
72, 73 REAR TURN SIGNAL LAMPS
82, 83, 85, 86 BULBS (TAIL LAMP BULB, TAIL/STOP LAMP BULB, TURN SIGNAL LAMP BULB, TURN SIGNAL LAMP BULB)
91, 96 LENSES
92, 98 UNIFORM-LIGHT-EMISSION DESIGN SURFACES (CUT-LENS PORTIONS)
93, 99 CLEAR LENS SURFACES (CLEAR LENS PORTIONS)
95 HORIZONTAL LINE
102 REFLECTOR
132, 152 EXTENSION LINES
144 REFERENCE AXIS

We claim:

1. A rear lighting device for a vehicle, the device comprising:
   a reflector;
   a bulb attached to the reflector; and
   a lens disposed rearward of the bulb and attached to the reflector,
   wherein,
   the lens is configured to be inclined obliquely rearwardly and upwardly,
   an upper half portion of the lens comprises a uniform-light-emission design surface including projections and depressions and extending in a vehicle width direction, and
   a lower half portion of the lens comprises a clear lens surface disposed frontward, in a vehicle body, of an extension line of the uniform-light-emission design surface.

2. The rear lighting device according to claim 1, wherein the bulb is visible through the clear lens surface when viewed horizontally from rear of the motorcycle.

3. The rear lighting device according to claim 1, wherein the rear lighting device includes a pair of left and right turn signal lamps provided integrally with a tail lamp in a rear portion of the vehicle body,
   the uniform-light-emission design surface is formed with a height that is gradually increased from side portions of the vehicle body to a center portion of the vehicle body, and a reference axis of the bulb is inclined in such a manner as to become closer to the center portion of the vehicle body toward a rear of the vehicle body.

4. The rear lighting device according to claim 1, wherein the clear lens surface is inclined less than the uniform-light-emission design surface.

5. The rear lighting device according to claim 3, wherein the rear lighting device includes the tail lamp between the left and right turn signal lamps, the uniform-light-emission design surface is formed in the upper half portion of the lens in such a manner that the uniform-light-emission design surface provided to the tail lamp extends to the center portion of the vehicle body from sides of the uniform-light-emission design surface provided to the left and right turn signal lamps, when viewed horizontally from behind, the uniform-light-emission design surface for the tail lamp has a belt-like shape curved to be convex upward, and is provided above a tail/stop lamp bulb provided to the tail lamp, the tail/stop lamp bulb serving as a stop lamp bulb, and the clear lens surface provided to the tail lamp is disposed rearward of the tail/stop lamp bulb.

6. The rear lighting device according to claim 5, wherein a tail lamp bulb is provided on a center side of the vehicle body, frontward of the uniform-light-emission design surface for the tail lamp, and above the tail/stop lamp bulb, and the tail/stop lamp bulb is disposed on a horizontal line passing through left and right turn signal lamp bulbs and extending in the vehicle width direction.

7. The rear lighting device according to claim 3, wherein the clear lens surface of the tail lamp is located frontward of an extension line of the uniform-light-emission design surface of the tail lamp.

8. A method of providing a rear lighting device for a vehicle, the method comprising:
providing a reflector;
attaching a bulb to the reflector; and
attaching a lens, disposed rearward of the bulb, to the reflector,
configuring the lens to be inclined obliquely rearwardly and upwardly,
forming an upper half portion of the lens to include a uniform-light-emission design surface including projections and depressions and extending in a vehicle width direction, and
forming a lower half portion of the lens to include a clear lens surface disposed frontward, in a vehicle body, of an extension line of the uniform-light-emission design surface.

9. The method according to claim 8, further comprising:
disposing the bulb such that is visible through the clear lens surface when viewed horizontally from rear of the motorcycle.

10. The method according to claim 8, further comprising:
providing a pair of left and right turn signal lamps provided integrally with a tail lamp in a rear portion of the vehicle body, forming the uniform-light-emission design surface with a height that is gradually increased from side portions of the vehicle body to a center portion of the vehicle body, and inclining a reference axis of the bulb in such a manner as to become closer to the center portion of the vehicle body toward a rear of the vehicle body.

11. The method according to claim 8, further comprising:
inclining the clear lens surface less than the uniform-light-emission design surface.

12. The method according to claim 10, further comprising:
forming the uniform-light-emission design surface in the upper half portion of the lens in such a manner that the uniform-light-emission design surface provided to the tail lamp extends to the center portion of the vehicle body from sides of the uniform-light-emission design surface provided to the left and right turn signal lamps, wherein, when viewed horizontally from behind, the uniform-light-emission design surface for the tail lamp has a belt-like shape curved to be convex upward, and is provided above a tail/stop lamp bulb provided to the tail lamp, the tail/stop lamp bulb serving as a stop lamp bulb, and disposing the clear lens surface provided to the tail lamp rearward of the tail/stop lamp bulb.

13. The method according to claim 12, further comprising:
providing a tail lamp bulb on a center side of the vehicle body, frontward of the uniform-light-emission design surface for the tail lamp, and above the tail/stop lamp bulb, and disposing the tail/stop lamp bulb on a horizontal line passing through left and right turn signal lamp bulbs and extending in the vehicle width direction.

14. The method according to claim 10, further comprising:
disposing the clear lens surface of the tail lamp frontward of an extension line of the uniform-light-emission design surface of the tail lamp.

15. A rear lighting device for a vehicle, the device comprising:
reflecting means for reflecting light;
light bulb means, attached to the reflecting means, for providing illumination; and
lens means, disposed rearward of the light bulb means and attached to the reflecting means, for focusing the light;
the lens means is configured to be inclined obliquely rearwardly and upwardly,
an upper half portion of the lens means comprises a uniform-light-emission design surface including projections and depressions and extending in a vehicle width direction, and
a lower half portion of the lens means comprises a clear lens surface disposed frontward, in a vehicle body, of an extension line of the uniform-light-emission design surface.

* * * * *